(12) United States Patent
Lakirovich et al.

(10) Patent No.: US 8,975,772 B2
(45) Date of Patent: Mar. 10, 2015

(54) CONTACTLESS POWER DELIVERY SYSTEM FOR POWER-ASSISTED DOOR AND METHOD

(75) Inventors: Konstantin Lakirovich, Chicago, IL (US); Michael Robinson, Sycamore, IL (US)

(73) Assignee: Control Solutions LLC, Aurora, IL (US)

( * ) Notice: Subject to any disclaimer, the term of this patent is extended or adjusted under 35 U.S.C. 154(b) by 938 days.

(21) Appl. No.: 13/049,283

(22) Filed: Mar. 16, 2011

(65) Prior Publication Data

US 2012/0235788 A1    Sep. 20, 2012

(51) Int. Cl.
B60L 1/00    (2006.01)

(52) U.S. Cl.
USPC .......................... 307/9.1; 307/104

(58) Field of Classification Search
USPC .................................. 307/9.1, 104
See application file for complete search history.

(56) References Cited

U.S. PATENT DOCUMENTS

| | | | |
|---|---|---|---|
| 4,942,352 A | 7/1990 | Sano | |
| 5,594,316 A | 1/1997 | Hayashida | |
| 6,301,128 B1 | 10/2001 | Jang et al. | |
| 6,535,133 B2 | 3/2003 | Gohara | |
| 2009/0120002 A1 | 5/2009 | Domholt | |
| 2009/0159677 A1 | 6/2009 | Yakimov et al. | |
| 2012/0153736 A1* | 6/2012 | Karalis et al. | 307/104 |

* cited by examiner

Primary Examiner — Robert L. Deberadinis
(74) Attorney, Agent, or Firm — McCracken & Gillen LLC

(57) ABSTRACT

Power delivery systems and methods for delivering power from a vehicle to a vehicle door. The system includes a supporting device having a first portion fixedly mounted to a main frame and a second portion attached to a door. The second portion being movable about a hinge axis portion that connects the first portion to the second portion. An energy transmitting source is connected to a power frequency generator. The power frequency generator is connected to a power source and configured to couple an oscillating signal to the energy transmitting source. The energy transmitting source is mounted on the hinge axis portion of the supporting device. An energy receiving device is magnetically coupled to the energy transmitting source to receive a power signal from the energy transmitting source. The energy receiving device is mounted on the second portion of the supporting device at a fixed distance from the energy transmitting source. The energy receiving device receives the power signal from the energy transmitting source to deliver the power signal to powered components associated with the door. The power delivery is uninterrupted during opening and closing of the door.

40 Claims, 7 Drawing Sheets

CONTACTLESS POWER DELIVERY SYSTEM FOR POWER-ASSISTED DOOR AND METHOD

The invention relates to power-assisted door systems, and more particularly, to contactless power delivery in power-assisted door systems.

BACKGROUND

Power-assisted doors on vehicles are used to allow a user to open or close doors that may be difficult to control due to their size and weight. For example, military vehicles such as High Mobility Multipurpose Wheeled Vehicles (HMMWVs, or "Hummvees") are often provided with added armor that adds sufficient weight to the door to make it difficult to open and close without power-assistance. Power-assisted door systems use electric motors and mechanical assemblies to generate a controlled force to assist the user with the heavy doors.

The use of power-assisted door systems has complicated the delivery of power from the vehicle to the door of the vehicle. Power cables are typically used to deliver power from the vehicle to the door. Power cables may get caught between the door and vehicle frame. Repeated opening and closing of the vehicle door may result in significant wear and tear on the power cables as the cables are bent, stretched, twisted, pinched and otherwise battered during the movement of the door.

Contactless energy delivery systems have been developed to deliver power to a powered vehicle door. However, conventional contactless systems only deliver energy when the vehicle door is adjacent to the frame of the vehicle, which occurs when the door is in the closed position. Power delivery systems have not been able to provide power-assisted doors with continuous power delivery during the opening and closing of the doors.

There is a need for a contactless power delivery system that provides continuous power delivery during opening and closing of a door.

SUMMARY

In view of the above, a power delivery system is provided for delivering power from a vehicle to a vehicle door. The system includes a supporting device having a first portion fixedly mounted to a main frame and a second portion attached to a door. The second portion being movable about a hinge axis portion that connects the first portion to the second portion. An energy transmitting source connected to a power frequency generator. The power frequency generator is connected to a power source and configured to couple an oscillating signal to the energy transmitting source. The energy transmitting source is mounted on the hinge axis portion of the supporting device. An energy receiving device is magnetically coupled to the energy transmitting source to receive a power signal from the energy transmitting source. The energy receiving device is mounted on the second portion of the supporting device at a fixed distance from the energy transmitting source. The energy receiving device receives the power signal from the energy transmitting source to deliver the power signal to powered components of the door. The power delivery is uninterrupted during opening and closing of the door.

In one example implementation, the energy receiving device includes an extended power conducting rod connected to a receiving coil. A mobile coil is configured to move along the extended power conducting rod to maintain a magnetic coupling with the extended power conducting rod as the door is opened or closed.

In another example implementation, the energy receiving device includes a U-shaped energy receiving device made of magnetic material and mounted to maintain a magnetic coupling with the energy transmitting device. A mobile coil is configured to move along the U-shaped energy receiving device to maintain a magnetic coupling with the U-shaped energy receiving device as the door is opened or closed.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale or in their actual position in any given implementation, emphasis instead being placed upon illustrating the principles of the invention. In the figures, like reference numerals designate corresponding parts throughout the different views.

DETAILED DESCRIPTION

In the following description of example embodiments, reference is made to the accompanying drawings that form a part of the description, and which show, by way of illustration, specific example embodiments in which the invention may be practiced. Other embodiments may be utilized and structural changes may be made without departing from the scope of the invention.

Figure 1A:
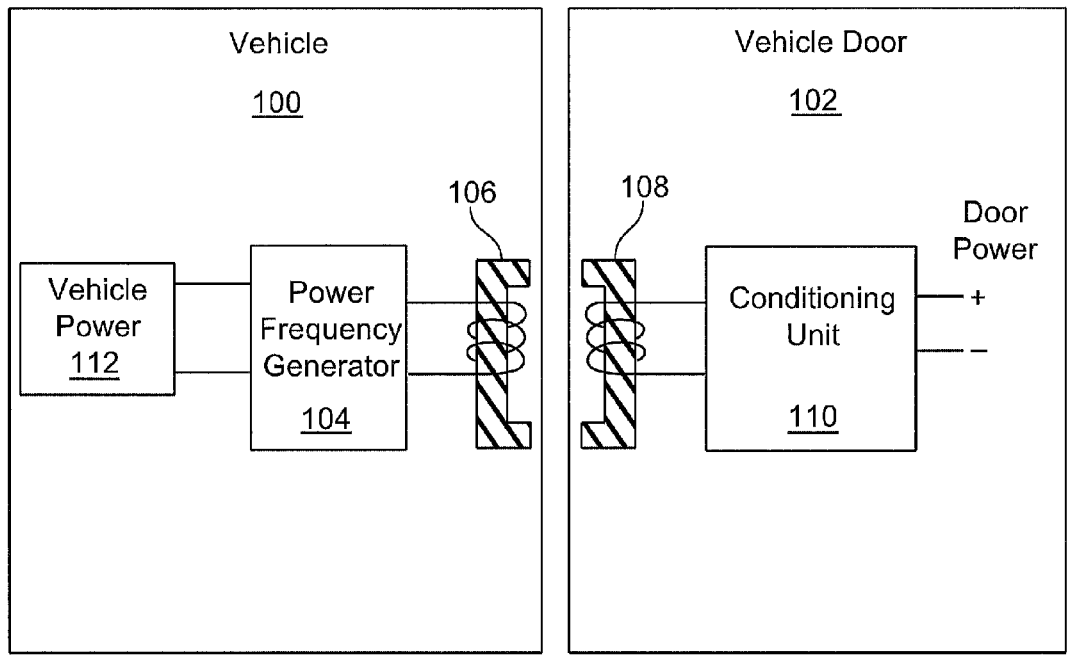
FIG. 1A is a schematic diagram of an example of a contactless power delivery system in a power-assisted door.

FIG. 1A is a circuit diagram of an example of a contactless power delivery system in a vehicle 100 having a power-assisted door 102. The vehicle 100 includes a vehicle power source 112, a power frequency generator 104, and an energy transmitting source 106. The vehicle door 102 includes an energy receiving device 108 and a conditioning unit 110. The contactless power delivery system provides power to the vehicle door 102 without the need to extend any wires from the vehicle 100 into the door 102. The vehicle door 102 may be mounted to the vehicle 100 on a hinge (not shown) that allows the vehicle door 102 to swing open and closed about the hinge. The vehicle door 102 may be power-assisted using an electric motor or hydraulic assembly to provide a force on the door in order to open or close the vehicle door 102. The contactless power delivery system in FIG. 1A is configured to provide uninterrupted power from the vehicle power source 112 to components that require electric power in the vehicle door 102 during the opening or closing of the vehicle door 102.

The vehicle power source 112 may be a vehicle battery or any other suitable power source within the vehicle to provide electric power to the components in the vehicle that require power. The vehicle power source 112 is connected to provide power to the power frequency generator 104. As an example, the vehicle power source 112 may provide a DC bias to an oscillator circuit, which generates an oscillating signal with a voltage swing determined by the voltage level of the vehicle power source 112. The power frequency generator 104 may generate an AC signal having a peak positive and negative voltage level based on the voltage level of the vehicle power source 112. The oscillating signal may be coupled to the energy transmitting source 106, which generates an oscillating magnetic field. The energy transmitting source 106 in the example shown in FIG. 1A is a transmitting coil, and the energy receiving device 108 is a receiving coil.

The energy transmitting source 106 and the energy receiving device 108 may be inductively coupled to permit the transfer of electrical energy between the energy transmitting source 106 in the vehicle 100 to the energy receiving device 108 in the vehicle door 102. The energy receiving device 108 receives the oscillating signal via the inductive coupling and couples the oscillating signal to the conditioning unit 110. The conditioning unit 110 may include a rectifier or other power conversion components to provide a DC power source to components in the vehicle door 102. The conditioning unit 110 may also provide an AC power signal using the energy obtained from the oscillating signal received from the energy receiving device 108. The oscillating signal may also be delivered as a power source to electrical components in the vehicle door 102 without using a conditioning unit 110.

In example implementations, the contactless power delivery system in FIG. 1A provides uninterrupted power even as the door is opening or closing. Vehicle doors on vehicles that use power-assisted door systems to open and close the doors are subject to rotational movement about a hinge. Such vehicle doors have a movement profile that is primarily rotational movement. Some vehicles are equipped with armor or other components on the doors that may provide a substantial obstacle for power-assist components near the hinge axis portion of the door. The power assist components are typically mounted in a position that is offset from the door hinge. The movement profile for such vehicle doors includes a linear movement in addition to rotational movements. The linear movement may result from the separation of the power assist components from the door hinge, or in some cases, from actual linear movement of the door relative to the door hinge. For example, the power assistance mechanism for a vehicle door of an armored vehicle may include a door-opening component, such as for example, a hydraulic cylinder that moves a piston in and out as the vehicle door rotates open and closed. In order to accommodate the movement of the door-opening component, the vehicle door may be designed to also move linearly along the vehicle frame as the door is opened and closed. Example implementations of the contactless power delivery system may be configured to operate on vehicle doors exhibiting rotational and linear movement as well as doors exhibiting only rotational movement.

Figure 1B:
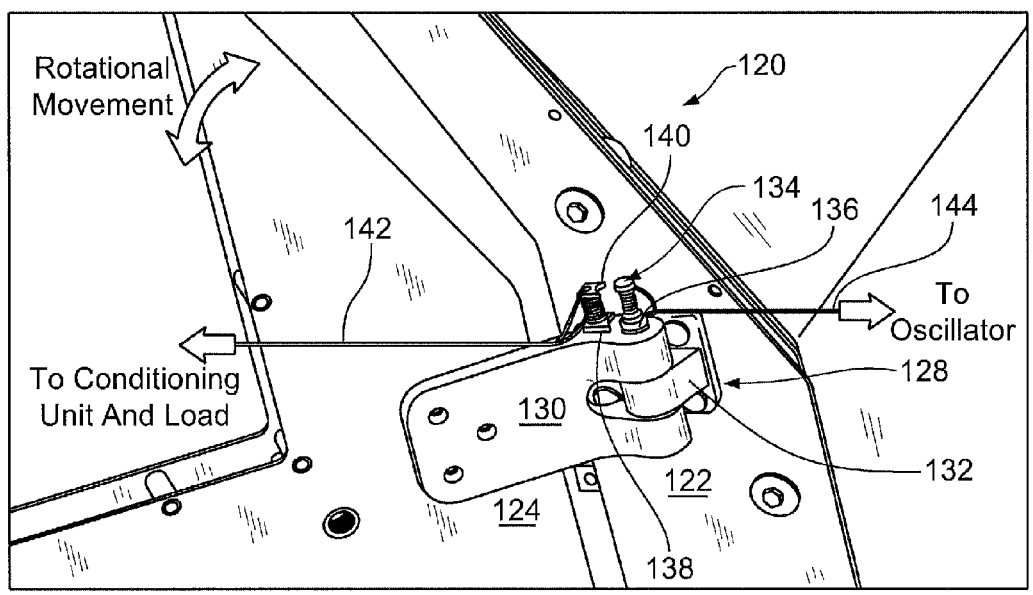
FIG. 1B shows an example of an implementation of the system shown in FIG. 1A.

FIG. 1B is a schematic diagram illustrating implementation of a first example of a contactless power delivery system 120 in a power-assisted door. The contactless power delivery system 120 in FIG. 1B is configured to operate on a vehicle door 124 having rotational movement about a hinge 128, which connects the door 124 to a vehicle frame 122. The hinge 128 includes a fixed hinge portion 132 attached to the vehicle frame 122 and a rotating hinge portion 130 attached to the vehicle door 124. The rotating hinge portion 130 rotates about a hinge axis portion, which connects the rotating portion 130 to the fixed portion 132.

The contactless power delivery system 120 in FIG. 1B includes a transmitting coil 134 mounted on the hinge axis portion that holds the rotating hinge portion 130 to the fixed hinge portion 132. The transmitting coil 134 may be mounted on a transmitting coil base 136 that may be mounted on the hinge axis portion of the hinge 128. The transmitting coil 134 may also be integral with the hinge axis portion. For example, the transmitting coil 134 may be formed with a rigid extension to fit into a hinge as a substitute hinge axis portion. The transmitting coil 134 operates as the energy transmitting source 106 shown in FIG. 1A. A receiving coil base 138 may be affixed to the rotating hinge portion 130 to support a receiving coil 140. The receiving coil 140 may also be mounted directly on the rotating hinge portion 130 without a receiving coil base 138, or using other suitable mounting structures. The receiving coil 140 operates as the energy receiving device 108 in FIG. 1A.

The transmitting coil 134 is connected to a power frequency generator (not shown in FIG. 1B) via the source power connections 144 to receive an oscillating signal as described above with reference to FIG. 1A. The receiving coil 140 is connected to a conditioning unit or a load (not shown in FIG. 1B) via load power connections 142 to provide power to components on the vehicle door 124.

The receiving coil 140 and transmitting coil 134 are positioned on their corresponding hinge portions so that the receiving coil 140 remains a fixed distance from the transmitting coil 134 as the receiving coil 140 moves with the motion of the vehicle door 124 about the transmitting coil 134. By retaining a fixed distance between the transmitting coil 134 and the receiving coil 140, the power transfer via the inductive coupling between the transmitting coil 134 and the receiving coil 140 is not interrupted by the motion of the door 124.

FIG. 1B illustrates an example of a contactless delivery system 120 for a vehicle 122 having a vehicle door 124 with a rotational movement profile. Examples described below with reference to FIGS. 2A, 2B, 3A, and 3B may implement contactless delivery systems in vehicles having doors with rotational and linear movement profiles.

Figure 2A:
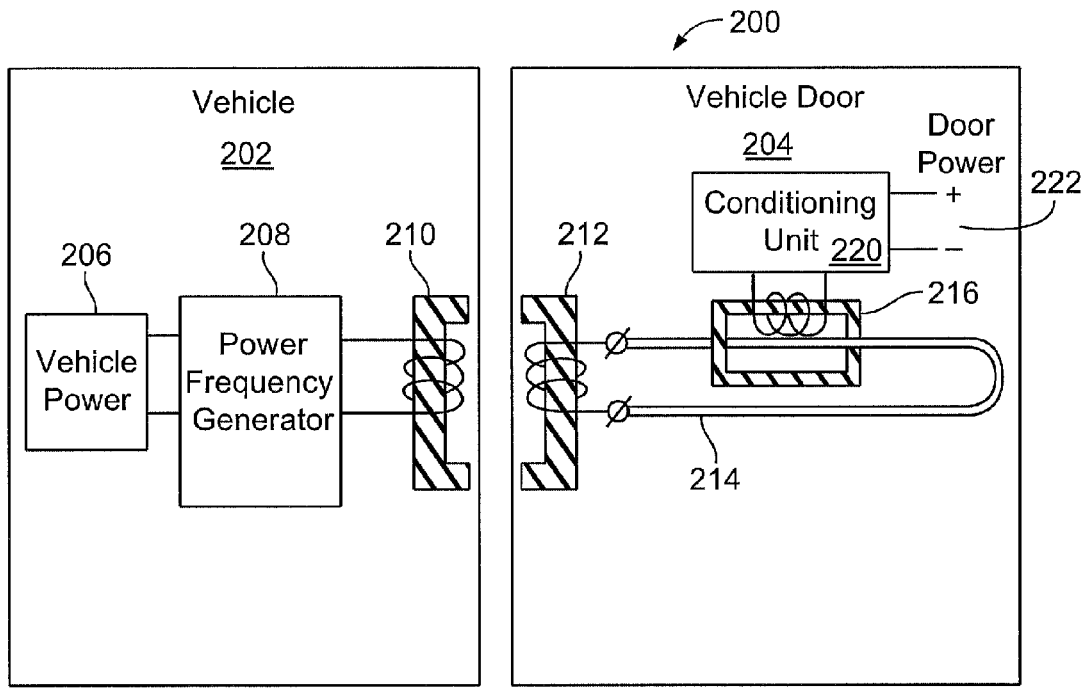
FIG. 2A is a schematic diagram of another example of a contactless power delivery system in a power-assisted door.

FIG. 2A is a schematic diagram of another example of a contactless power delivery system 200 used in a vehicle 202 having a power-assisted door 204 in which the power-assisted door 204 has a rotational and linear movement profile. The contact delivery system 200 includes a vehicle power source 206 connected to a power frequency generator 208. The power frequency generator 208 is connected to an energy transmitting source 210. The power frequency generator 206 and energy transmitting source 210 are mounted in the vehicle 202, and the energy transmitting coil 210 is positioned near the structure attaching the door 204 to the vehicle 202.

The contactless power delivery system 200 also includes a receiving coil 212, an extended power conductor 214, a mobile coil 216, a conditioning unit 220, and door power terminals 222. The vehicle power source 206 provides a power source in the form of a DC voltage level, for example, to the power frequency generator 208. The power frequency generator 208 generates an oscillating signal from the power source and outputs the oscillating power signal to the energy transmitting source 210. The energy transmitting source 210 generates an oscillating magnetic field that is inductively coupled to the receiving coil 212. The receiving coil 212 generates a received oscillating power signal as current flowing in the extended power conductor 214. The current of the oscillating power signal flowing in the extended power conductor 214 generates an oscillating magnetic field that is inductively coupled to the mobile coil 216, which generates a corresponding oscillating power signal. The oscillating signal generated by the mobile coil 216 is coupled to the conditioning unit 220. The conditioning unit 220 uses the oscillating power signal to generate a door power source at the door power terminals 222.

The contactless power delivery system 200 in FIG. 2A allows for delivery of the vehicle power to electrical components in the vehicle door 204 without interruption even as the vehicle door 204 is opened and/or closed. In addition, the mobile coil 216 reduces the need for excess wiring to compensate for the door movement thereby reducing the potential for tangling and cutting of any power delivery conductors.

Figure 2B:
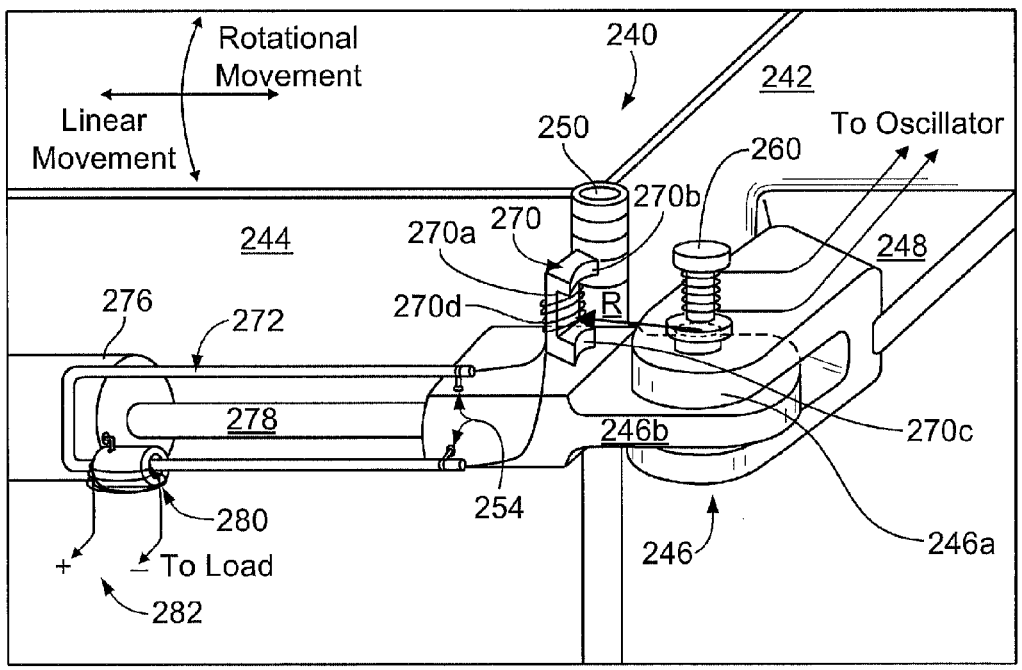
FIG. 2B shows an example of an implementation of the system shown in FIG. 2A.

FIG. 2B shows an example of an implementation of the system shown in FIG. 2A. The contactless power delivery system 240 in FIG. 2B is configured to operate on a vehicle frame 242 having a vehicle door 244 with both a rotational and linear movement profile. The vehicle door 244 may be attached to the vehicle frame 242 at a hinge 250. The components of the power-assist system provide linear push and pull forces to a clevis 246 fixed to the vehicle frame 242 at a clevis mounting portion 248.

The clevis 246 in FIG. 2B includes a fixed clevis portion 246a and a rotating clevis portion 246b. The fixed clevis portion 246a includes a hinge axis portion (not shown) positioned in the fixed clevis portion 246a to hold the rotating clevis portion 246b and to permit the rotating clevis portion 246b to rotate about the hinge axis portion. The contactless power delivery system 240 includes a transmitting coil 260 affixed to the fixed clevis portion 246a to align with the hinge axis portion, and a receiving coil 270 mounted on the rotating clevis portion 246b. The transmitting coil 260 may be affixed to the hinge axis portion of the clevis 246 by any suitable fixing scheme by mounting directly on the hinge axis portion, or by a mediating device such as a mounting base. The transmitting coil 260 may also be integral with the hinge axis portion. For example, the transmitting coil 260 may be formed with a rigid extension to fit into the clevis 246 as a substitute hinge axis portion.

The transmitting coil 260 operates as the energy transmitting source 106 in FIG. 1A. The receiving coil 270 operates as the energy receiving device 108 in FIG. 1A, and receives signals from the transmitting coil 260 via magnetic coupling. The receiving coil 270 is positioned on the rotating clevis portion 246b a distance R along a radius extending from the hinge axis portion of the fixed clevis portion 246a. In an example implementation, the receiving coil 270 may include a magnetic core 270a (in FIG. 2B) having first and second ends 270b,c extending from a coil wire 270d. Each of the first and second ends 270b,c may include an arcuate-defined surface that faces the transmitting coil 260 along a circumference at the fixed radial distance R.

The power assist components on the door 244 of the vehicle 242 in FIG. 2B include an extending rod 278 operating cooperatively with a door-opening device 276 and the rotating clevis portion 246b to push and pull the door 244 to an open or closed position. The extending rod 278 is fixed at the rotating clevis portion 246b extending radially from the hinge axis portion of the fixed clevis portion 246a. The door-opening device 276, which may include a hydraulic cylinder, is fixed at a point on the door 244. The door-opening device 276 moves along the extending rod 278 using hydraulic or electrical energy to create a linear force along the extending rod 278 that pushes against the rotating clevis portion 246b when opening the door 244. As the door is opening, the distance between the door-opening device 276 and the rotating clevis portion 246b increases along the extending rod 278. As the door is closing, the distance between the door-opening device 276 and the rotating clevis portion 246b decreases along the extending rod 278.

The contactless power delivery system in FIG. 2B includes an extended power conductor 272 attached to the rotating clevis portion 246b at an extended conductor bracket 254. The extended power conductor 272 extends substantially parallel to the extending rod 278 and substantially parallel to the door 244 towards the door-opening device 276. The extended power conductor 272 may be any metal, or electrically conductive material, that is sufficiently long and sufficiently rigid to allow a coil formed around the conductor 272 to repeatedly move along the length of extended power conductor 272. The extended power conductor 272 in FIG. 2B is U-shaped with an open end positioned at the extended conductor bracket 254 and a closed end positioned next to the door-opening device 276; however, any suitable shape may be used. The length of the extended power conductor 272 should be at least the maximum length of the extending rod 278, such as when the door 244 is at its most open position. The two ends of the U-shaped extended power conductor 272 that form the open side of the 'U' shape attached to the rotating clevis portion 246b using the extended conductor bracket 254 to place the two ends of the extended power conductor 272 near the receiving coil 270. The extended power conductor 272 is connected to the receiving coil 270 to form a closed loop with the receiving coil 270.

The contactless power delivery system in FIG. 2B also includes a mobile coil 280 configured to move linearly substantially in parallel with the extending rod 278. The mobile coil 280 shown in FIG. 2B forms a collar around the extended power conductor 272 allowing the mobile coil 280 to move along the length of the extended power conductor 272 as the door 244 moves. The mobile coil 280 in FIG. 2B is attached to the door-opening device 276 and moves with the door-opening device 276 along the extended power conductor 272 as the door 244 opens and closes. The mobile coil 280 is inductively coupled to the extended power conductor 272 and maintains the inductive coupling as the mobile coil 280 moves along the extended power conductor 272. When the transmitting coil 260 generates an oscillating signal, the receiving coil 270 receives the oscillating signal through inductive coupling with the transmitting coil 260. The oscillating signal is coupled to the ends of the extended power conductor 272 and the oscillating current in the extended power conductor 272 forms a magnetic field that couples the oscillating signal to the mobile coil 280 for delivery to a load, or a conditioning unit via a door power terminal 282.

Figure 3A:
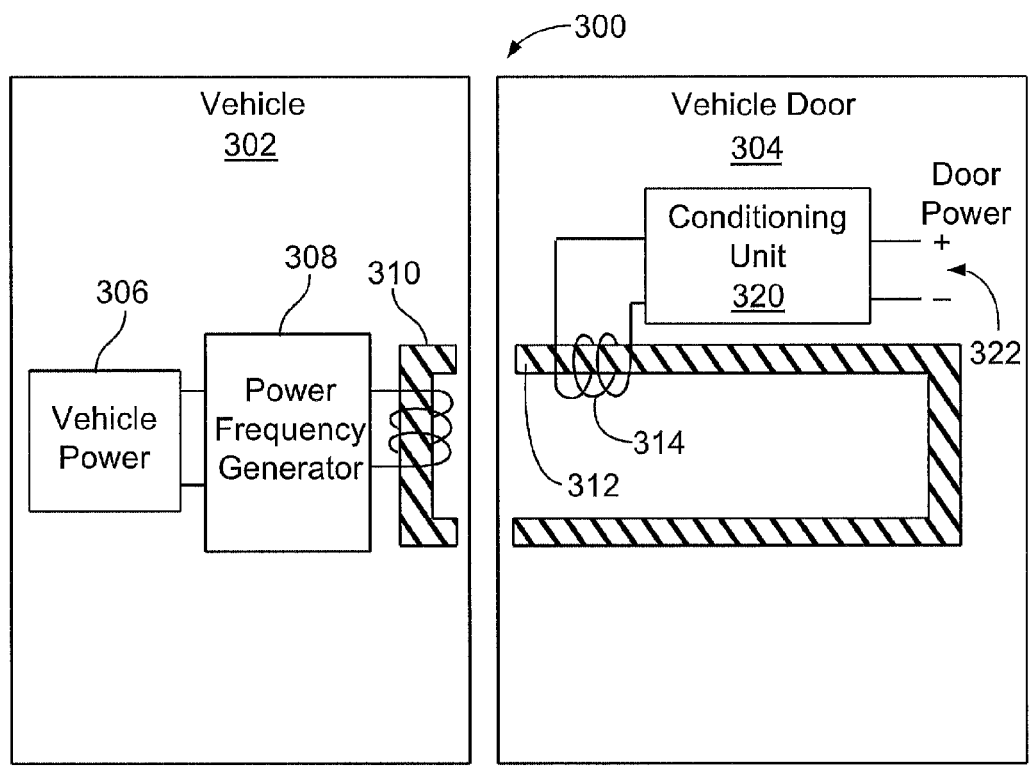
FIG. 3A is a schematic diagram of another example of a contactless power delivery system in a power-assisted door.

FIG. 3A is a schematic diagram of another example of a contactless power delivery system 300 used in a vehicle 302 having a power-assisted door 304 in which the power-assisted door 304 has a rotational and linear movement profile. The contact delivery system 300 includes a vehicle power source 306 connected to a power frequency generator 308. The power frequency generator 308 is connected to an energy transmitting source 310. The power frequency generator 306 and energy transmitting source 310 are mounted in the vehicle 302, and the energy transmitting coil 310 is positioned near the structure attaching the door 304 to the vehicle 302.

The contactless power delivery system 300 also includes an energy receiving device 312, a mobile coil 314, a conditioning unit 320, and door power terminals 322. The vehicle power source 306 provides a power source in the form of a DC voltage level, for example, to the power frequency generator 308. The power frequency generator 308 generates an oscillating signal from the power source and outputs the oscillating power signal to the energy transmitting source 310. The energy transmitting source 310 generates an oscillating magnetic field that is inductively coupled to the energy receiving device 312. The energy receiving device 312 generates a received oscillating power signal as an oscillating magnetic field that is inductively coupled to the mobile coil 314, which generates a corresponding oscillating power signal. The oscillating signal generated by the mobile coil 314 is coupled to the conditioning unit 320. The conditioning unit 320 uses the oscillating power signal to generate a door power source at the door power terminals 322.

The contactless power delivery system 300 in FIG. 3A allows for delivery of the vehicle power to electrical components in the vehicle door 304 without interruption even as the vehicle door 304 is opened and/or closed. In addition, the mobile coil 316 reduces the need for excess wiring to compensate for the door movement thereby reducing the potential for tangling and cutting of any power delivery conductors.

Figure 3B:
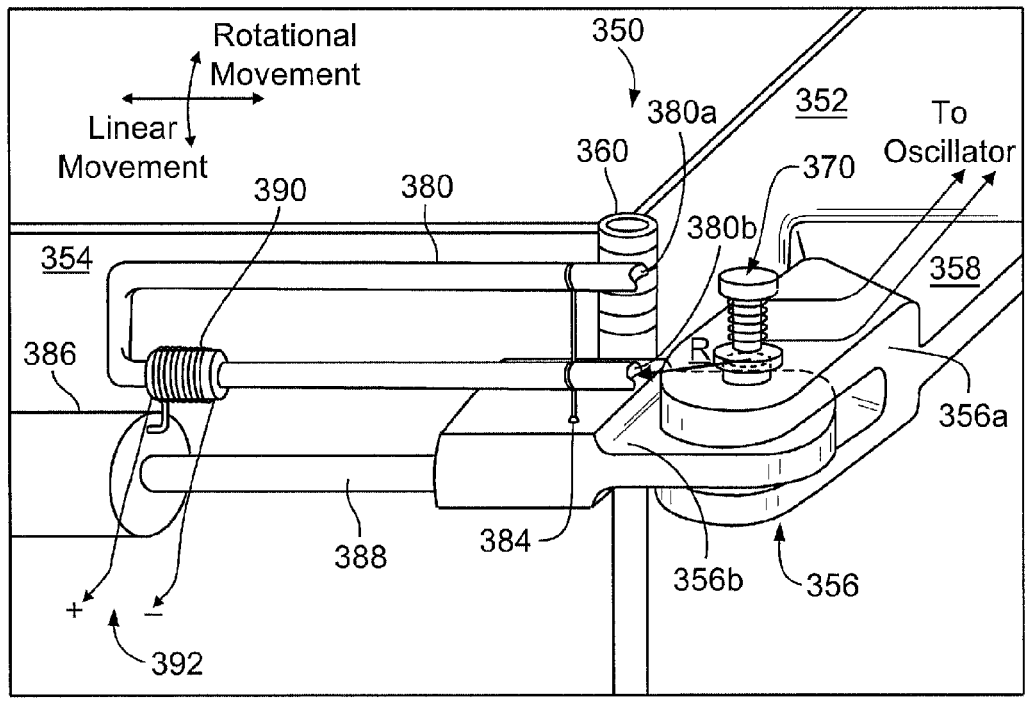
FIG. 3B shows an example of an implementation of the system shown in FIG. 3A.

FIG. 3B is a schematic diagram illustrating implementation of another example of a contactless power delivery system in a power-assisted door. The contactless power delivery system 350 in FIG. 3B is configured to operate in a vehicle frame 352 having a vehicle door 354 with a rotational and linear movement profile. The vehicle door 354 may be attached to the vehicle frame 352 at a hinge 360. The components of the power-assist system may be configured to provide linear push and pull forces to a clevis 356 fixed to the vehicle frame 352 at a clevis mounting portion 358.

The clevis 356 in FIG. 3B includes a fixed clevis portion 356a and a rotating clevis portion 356b. The fixed clevis portion 356a includes a hinge axis portion (not shown) positioned in the fixed clevis portion 356a to hold the rotating clevis portion 356b to permit the rotating clevis portion 356b to rotate about the hinge axis portion. The contactless power delivery system 350 includes a transmitting coil 370 affixed to the fixed clevis portion 356a to align with the hinge axis portion, and an energy receiving device 380 mounted on the rotating clevis portion 356b. The transmitting coil 370 may be affixed to the hinge axis portion of the clevis 356 by any suitable fixing scheme; such as by mounting directly on the hinge axis portion, or by using a mediating device such as a mounting base. The transmitting coil 370 may also be integral with the hinge axis portion. For example, the transmitting coil 370 may be formed with a rigid extension to fit into the clevis 356 as a substitute hinge axis portion.

The transmitting coil 370 operates as the energy transmitting source 310 in FIG. 3A. The energy receiving device 380 is mounted on the rotating clevis portion 356b with one end positioned a distance R from the fixed clevis portion 256a along a radius extending from the hinge axis portion.

The energy receiving device 380 in FIG. 3B includes a 'U'-shaped rod made of a magneto-soft material (for example, a ferrite, or ferrite composite) having two ends at the open side of the 'U' positioned to be at the fixed distance R from the transmitting coil 370. The energy receiving device 380 may be attached to the rotating clevis portion 356b using a bracket 384 so as to maintain the fixed distance R from the transmitting coil 370. The two ends of the open side of the 'U' at 380a,b may have an arcuate profile to maintain the fixed distance R at any point on the surface of the ends.

The energy receiving device 380 extends substantially parallel to the door 354 towards a door-opening device 386. An extending rod 388 extends between the door-opening device 386 and the rotating clevis portion 356b. The extending rod 388 is fixed at the rotating clevis portion 356b. The door-opening device 386, which may include a hydraulic cylinder, moves along the extending rod 388 using hydraulic or electrical energy to create a linear force along the extending rod 388 that pushes against the rotating clevis portion 356b when opening the door 354. As the door 354 is opening, the distance between the door-opening device 386 and the rotating clevis portion 356b increases along the extending rod 388. As the door 354 is closing, the distance between the door-opening device 388 and the rotating clevis portion 356b decreases along the extending rod 388.

The contactless power delivery system in FIG. 3B includes a mobile coil 390 that forms a collar around the energy receiving device 380. The mobile coil 390 in FIG. 3B is attached to the door-opening device 386 and configured to move with the door-opening device 386 along the energy receiving device 380 as the door 354 opens and closes. The mobile coil 390 is magnetically coupled to the energy receiving device 380. When the transmitting coil 370 generates an oscillating signal, the energy receiving device 380 receives the oscillating signal through a magnetic coupling with the transmitting coil 370 at the two ends close to the transmitting coil 370. The oscillating signal is induced in the magnetic energy receiving device 380 creating an oscillating magnetic field that transfers energy to the mobile coil 390. The mobile coil 390 generates the oscillating signal for delivery to a load or a conditioning unit via the door power terminals 392.

Figure 4A:
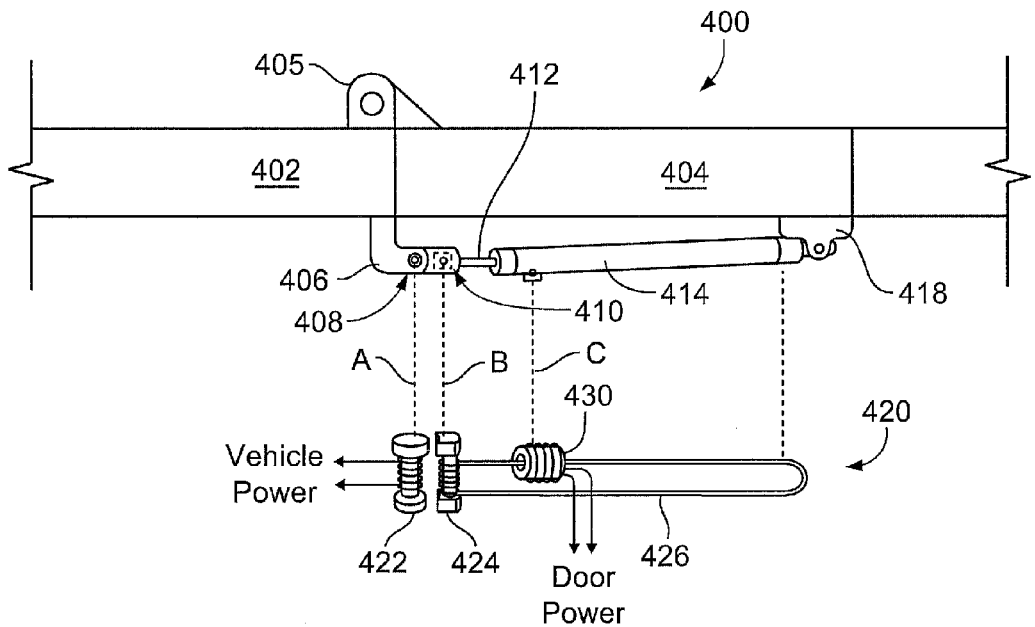
FIGS. 4A, 4B and 4C illustrate operation of the contactless power delivery system during the opening of a power-assisted door.
Figure 4B:
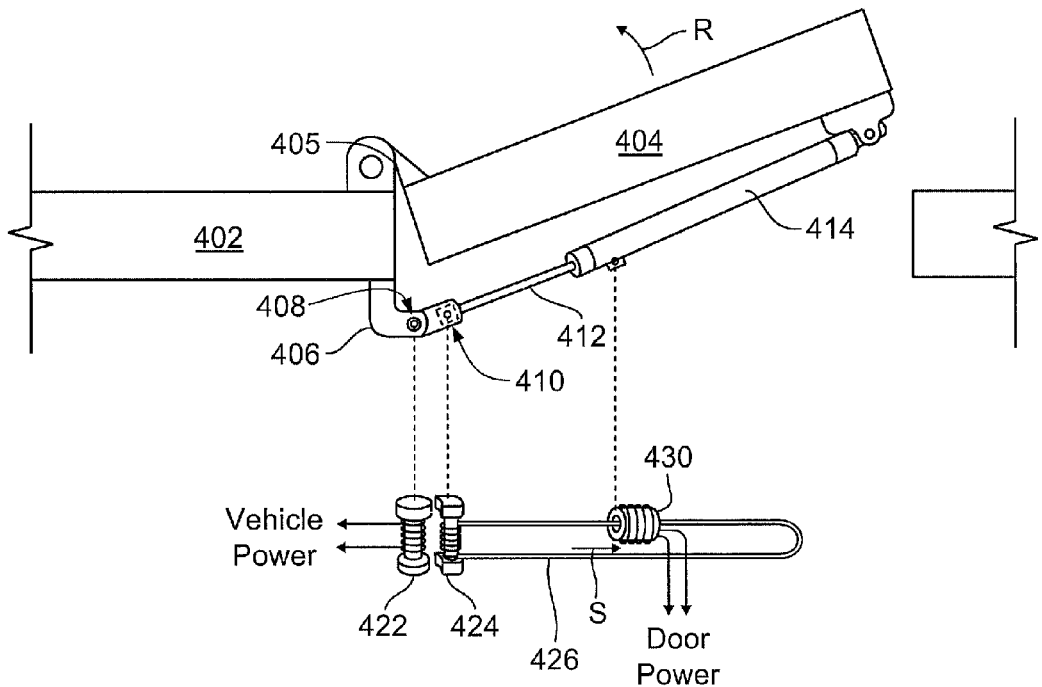
Figure 4C:
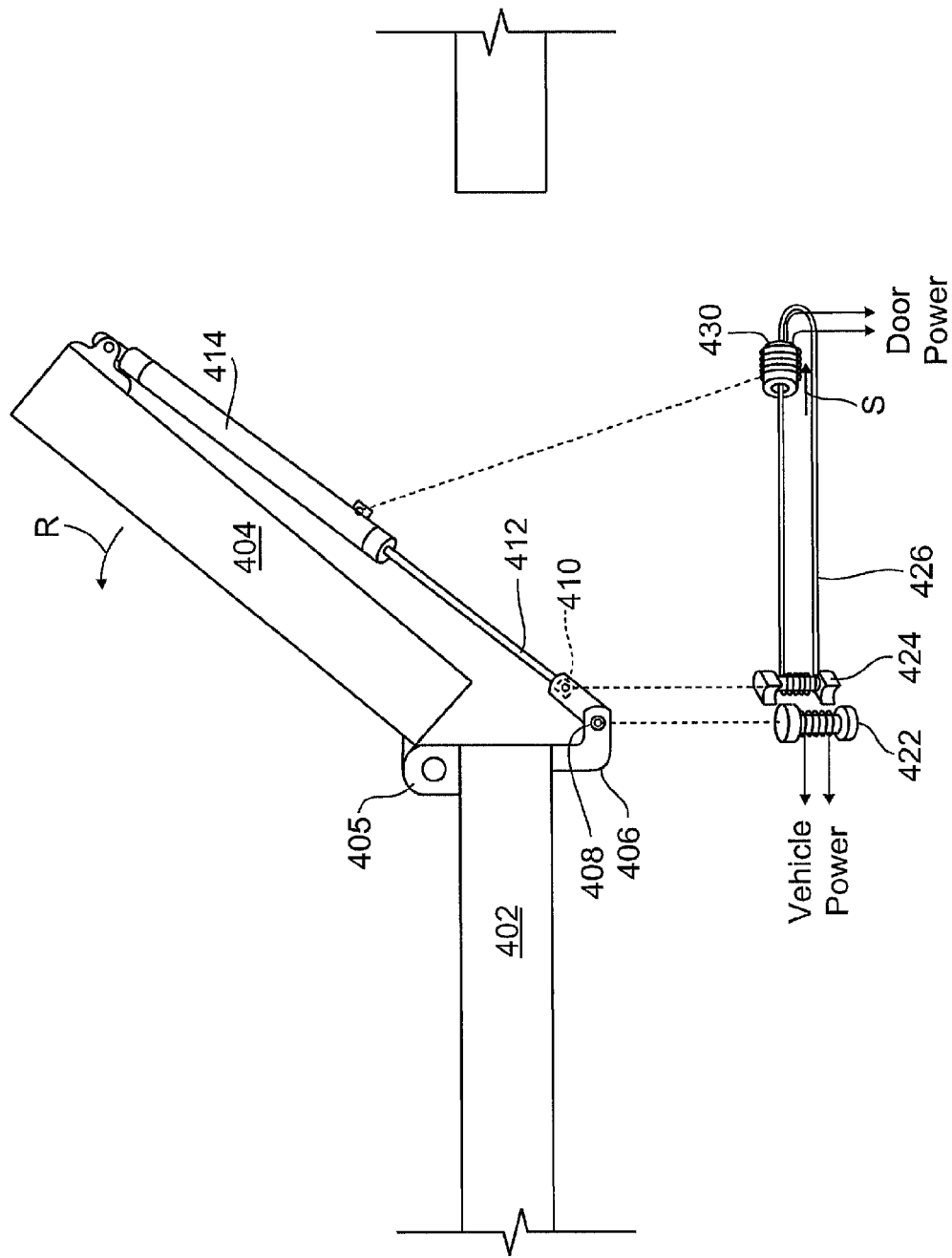

FIGS. 4A, 4B and 4C illustrate operation of a contactless power delivery system 400 during the opening of a power assisted door. FIG. 4A shows a vehicle wall 402 at a portion of the vehicle at which a vehicle door 404 attaches via a hinge axis portion 405. The door 404 in FIG. 4A is shown in a closed position. The contactless power delivery system 400 shown in FIG. 4A operates cooperatively with power assisted door opening components that include a first clevis point 406, a fixed clevis portion 408, a rotating clevis portion 410, an extending rod 412, a cylinder 414, and a second clevis point 418. The contactless power delivery system 400 includes components 420 illustrated in FIG. 4A as detached from the power assisted door 404 and its components. The contactless power delivery system components 420 include a transmitting coil 422, a receiving coil 424, an extended power conductor 426 and a mobile coil 430.

The attachment of contactless power delivery system components 420 to power assisted door opening components is illustrated by dotted lines at A, B, and C. The lines A, B, and C indicate points on the power assisted door opening components at which the corresponding components of the contactless power system 420 are attached. For example, the transmitting coil 422 is attached to the fixed clevis portion 408 as indicated by broken line A. The receiving coil 424 is affixed to the rotating clevis portion 410 as indicated by broken line B. The mobile coil 430 is attached to the cylinder 414 as indicated by broken line C. The transmitting coil 422 is mounted on the fixed clevis portion 408 on the axis of rotation of the first clevis point 408 and thus remains fixed whether the door is opening or closing. The receiving coil 424 is mounted on the rotating clevis portion 410 such that it is a fixed distance from the transmitting coil 422 as the door is opened or closed. The mobile coil 430 moves with the motion of the cylinder 414 as the cylinder 414 moves against the extending rod 412 to open or close the door 404. As noted, the door 404 is in a closed position in FIG. 4A.

FIG. 4B shows the door 404 partially opened conveying the state of the door 404 during the opening of the door 404. The door 404 is illustrated as following an angular path along indicated by arcuate arrow R. As the door 404 opens, the extended rod 412 lengthens as the cylinder 414 moves the door outward. The outward motion of the door 404 and the linear motion of the cylinder 414 move the mobile coil 430 as indicated by arrow S along the extended power conductor 426. The receiving coil 424 moves radially about the transmitting coil 422 a fixed distance from the transmitting coil 422. The fixed distance between the transmitting coil 422 and receiving coil 424 keeps the energy transfer from the transmitting coil to the receiving coil 424 substantially constant as the door 404 moves outward along the angular path R. The energy transfer generates the corresponding current through the extended power conductor 426. The mobile coil 430 slides along the extended power conductor 426 as the door moves outward without any loss of power transfer.

In FIG. 4C, the door 404 is shown in a substantially more open position. The length of the extending rod 412 is even greater as it extends away from the cylinder 414. The mobile coil 430 is shown further along the extended power connector 426 to correspond with the motion of the cylinder 414 as the door opens. The mobile coil 430 moves along the extended power conductor 426 without any loss of power transfer.

Figure 5:
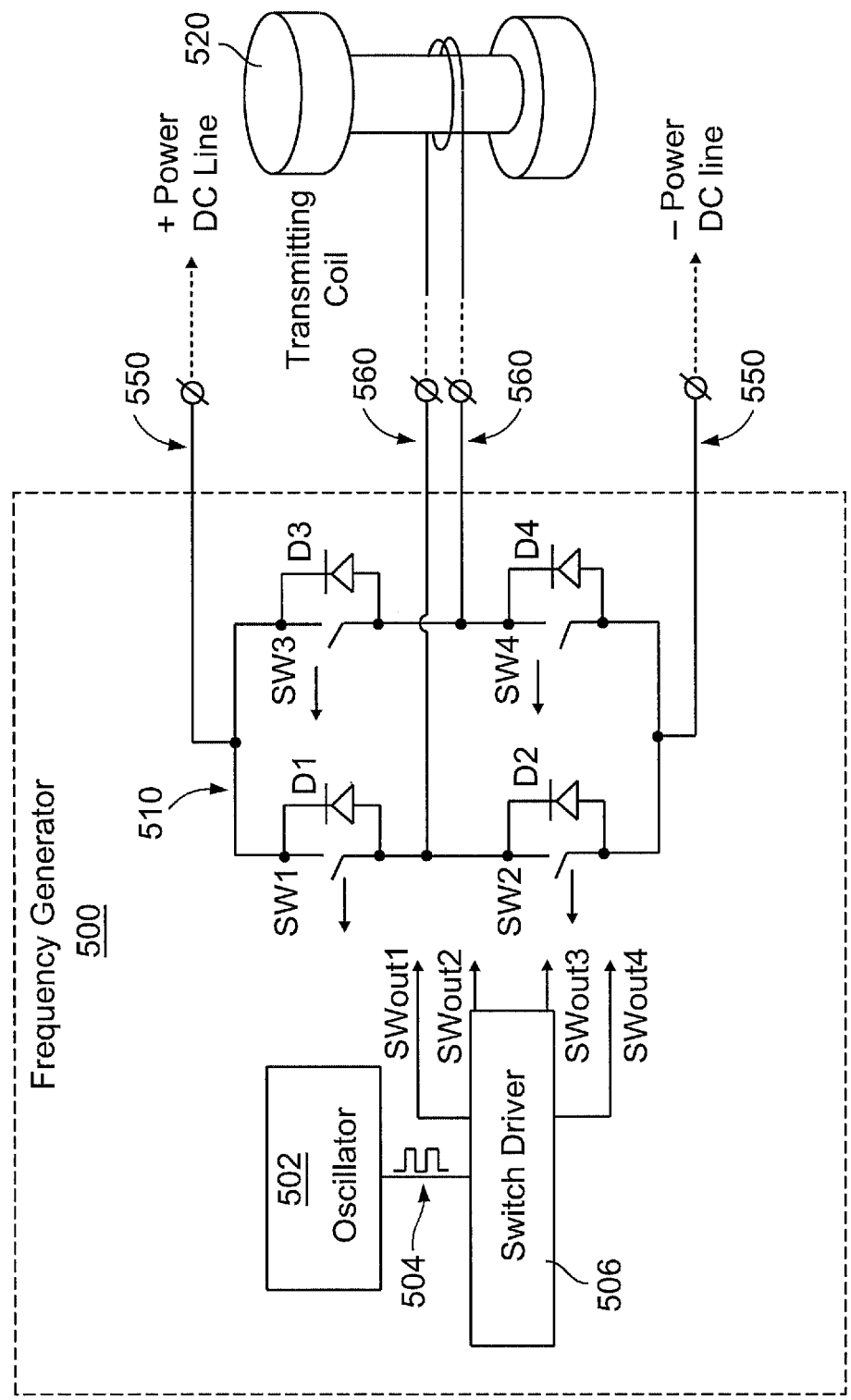
FIG. 5 is a schematic diagram of an example of a frequency generator.

FIG. 5 is a schematic diagram of a frequency generator 500 that may be used to generate an oscillating power signal from a vehicle DC power supply. The frequency generator 500 includes an oscillator 502 connected to a switch driver 506. The switch driver 506 opens and closes switches in a DC to AC converter 510. The DC to AC power converter 510 includes a first switch S1 connected in parallel to a first diode D1, a second switch SW2 connected in parallel to a second diode D2, a third switch SW3 connected in parallel with a third diode D3, and a fourth switch SW4 connected in parallel to a fourth diode D4. The switches SW1, SW2, SW3, and SW4 and diodes D1, D2, D3, and D4 are connected in a well-known circuit that converts the DC voltage at DC terminals 550 to an AC voltage at AC terminals 560. The DC-to-AC converter 510 transfers a positive DC voltage level to one of the AC terminals 560 and a negative DC voltage level to the other AC terminal 560 alternating between the AC terminals 560 in accordance with the state of the switches SW1, SW2, SW3, and SW4.

The state of the switches SW1, SW2, SW3, and SW4 is controlled by the oscillating signal generated by the frequency generator 500. The frequency of the AC voltage corresponds to the frequency of the oscillating signal. The switch driver 506 receives the oscillating signal and generates a pulse to the switch driver outputs SWOUT1, SWOUT2, SWOUT3, and SWOUT4 in a pattern that turns the switches SW1, SW2, SW3, and SW4 on and off to generate the desired AC voltage.

Figure 6:
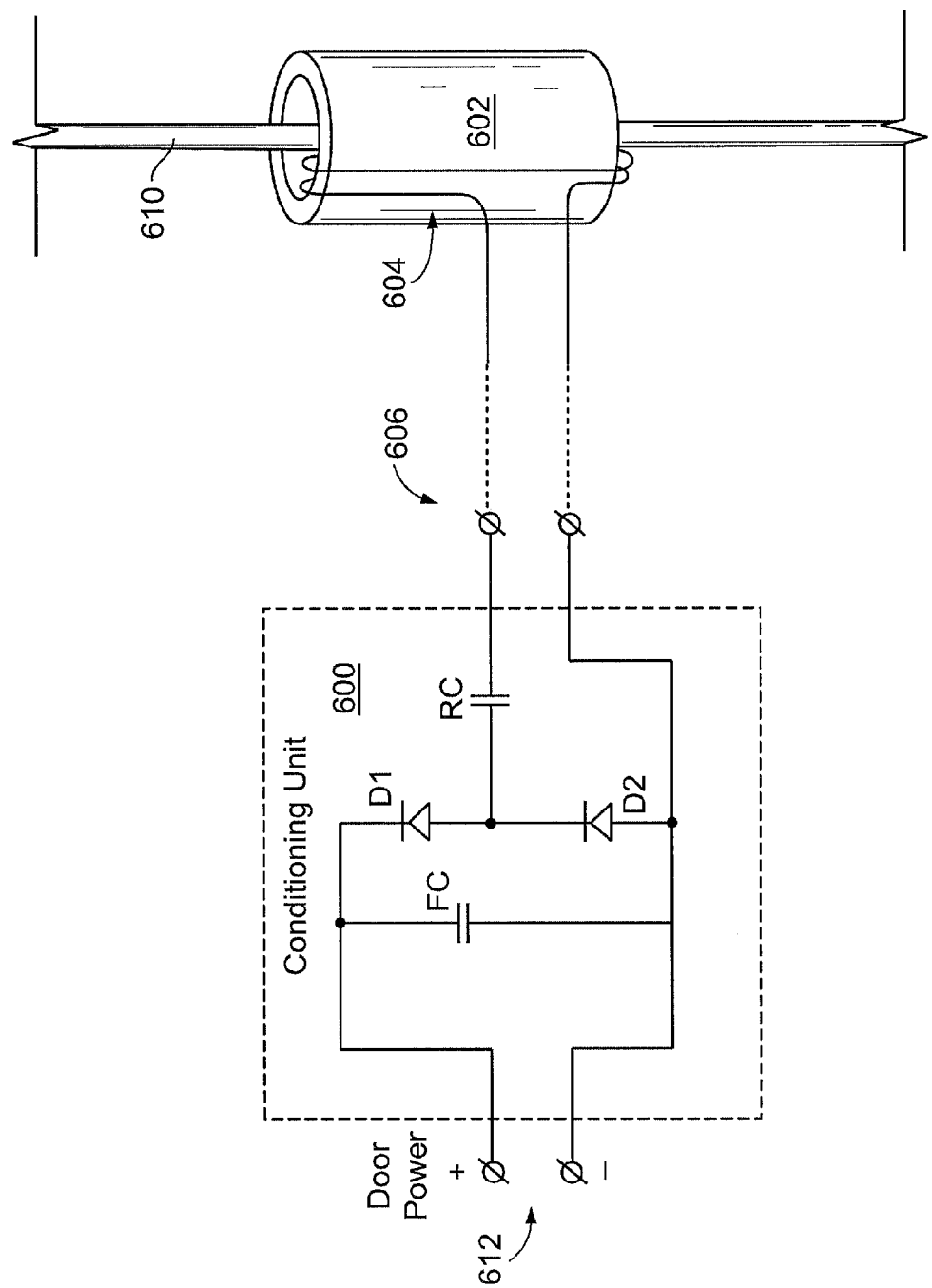
FIG. 6 is a schematic diagram of an example of a conditioning unit.

FIG. 6 is a schematic diagram of an example of a conditioning unit 600. The conditioning unit 600 may be implemented in a contactless power delivery system such as systems described above with reference to FIGS. 1A, 1B, 2A, 2B, 3A, and 3B to convert an AC voltage received from a vehicle power source to a corresponding DC power source used by electrical components in a door. The conditioning unit 600 receives an AC voltage from a mobile coil 602 formed around a power conductor 610. The mobile coil 602 may be formed with a collar-shaped ferrite material with a coil wire 604 wrapped around the ferrite collar. The coil wire 604 generates an AC voltage when AC current flows in the power conductor 604. The AC voltage is coupled to conditioning unit input terminals 606 for input to the conditioning unit 600. The conditioning unit 600 includes a resonance capacitor RC connected between rectifier diodes D1 and D2. Diode D1 outputs a DC voltage level at a filter capacitor FC, which couples the DC voltage level to conditioning unit output terminals 612.

The conditioning unit 600 in FIG. 6 illustrates one example of a circuit that may be used to condition electrical energy received from a vehicle power source at the mobile coil output for use as a power source for electrical components on the door. Other suitable conditioning units may be implemented according to the specific requirements of a specific implementation. In some implementations, a conditioning unit may not be needed.

Examples of contactless power delivery systems for use with power-assisted door have been described with reference to FIGS. 1A through 6. The example implementations may be built into the vehicle and door as original equipment. Alternatively, the contactless power delivery system may be provided as a kit for installation as a retrofit in an existing vehicle and power-assisted door system.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed is:

1. A power delivery system for providing power from a vehicle to a vehicle door, the power delivery system comprising:
   a supporting device having a first portion fixedly mounted to a vehicle frame and a second portion attached to a door and movable about a hinge axis portion that connects the first portion to the second portion;
   an energy transmitting source connected to a power frequency generator, the power frequency generator being connected to a power source and configured to couple an oscillating signal to the energy transmitting source, the energy transmitting source positioned aligned with the hinge axis portion of the supporting device;
   an energy receiving device magnetically coupled to the energy transmitting source to receive a power signal from the energy transmitting source, the energy receiving device mounted on the second portion of the supporting device at a fixed distance from the energy transmitting source where the energy transmitting source is configured to mount in a fixed position aligned with the hinge axis portion of the supporting device; and
   where the energy receiving device receives the power signal from the energy transmitting source to deliver the power signal to powered components and where the power delivery is uninterrupted during opening and closing of the door.

2. The power delivery system of claim 1 where:
   the supporting device is a hinge configured to mount the door to the vehicle frame, and further configured to support the energy transmitting source on the hinge axis portion and to support the energy receiving device on the second portion of the supporting device.

3. The power delivery system of claim 2 further comprising:
   an energy receiving device mounting base for mounting the energy receiving device to the second portion of the supporting device.
4. The power delivery system of claim 1 further comprising:
   a conditioning unit connected to receive the oscillating power signal from the energy receiving device and to convert the oscillating power signal to a vehicle door power source.
5. The power delivery system of claim 4 where the conditioning unit further includes:
   a rectifier for converting the oscillating power signal to a DC power source.
6. The power delivery system of claim 5 where the receiving device includes a coil, and the conditioning unit further includes:
   a resonance capacitor for maintaining a resonance circuit with the inductance of the receiving device.
7. The power delivery system of claim 1 where the power frequency generator includes:
   an oscillator to generate an oscillating DC signal having a selected AC power frequency;
   a switch driver to generate switch signals; and
   a DC-to-AC converter coupled to the vehicle power source and to the energy transmitting source, the DC-to-AC converter including a plurality of switches controlled by the switch signals from the switch driver to couple the vehicle power source to the energy transmitting source as an AC power signal.
8. A power delivery system for providing power from a vehicle to a vehicle door, the power delivery system comprising:
   a supporting device having a first portion fixedly mounted to a vehicle frame and a second portion attached to a door and movable about a hinge axis portion that connects the first portion to the second portion;
   an energy transmitting source connected to a power frequency generator, the power frequency generator being connected to a power source and configured to couple an oscillating signal to the energy transmitting source, the energy transmitting source positioned aligned with the hinge axis portion of the supporting device;
   an energy receiving device magnetically coupled to the energy transmitting source to receive a power signal from the energy transmitting source, the energy receiving device mounted on the second portion of the supporting device at a fixed distance from the energy transmitting source;
   where the energy receiving device receives the power signal from the energy transmitting source to deliver the power signal to powered components and where the power delivery is uninterrupted during opening and closing of the door;
   where the supporting device is a hinge configured to mount the door to the vehicle frame, and further configured to support the energy transmitting source on the hinge axis portion and to support the energy receiving device on the second portion of the supporting device; and
   an energy transmitting source mounting base for mounting the energy transmitting source to the hinge axis portion.
9. A power delivery system for providing power from a vehicle to a vehicle door, the power delivery system comprising:
   a supporting device having a first portion fixedly mounted to a vehicle frame and a second portion attached to a door and movable about a hinge axis portion that connects the first portion to the second portion;
   an energy transmitting source connected to a power frequency generator, the power frequency generator being connected to a power source and configured to couple an oscillating signal to the energy transmitting source, the energy transmitting source positioned aligned with the hinge axis portion of the supporting device;
   an energy receiving device magnetically coupled to the energy transmitting source to receive a power signal from the energy transmitting source, the energy receiving device mounted on the second portion of the supporting device at a fixed distance from the energy transmitting source;
   where energy receiving device receives the pwer signal from the energy transmitting source to deliver the power signal to powered components and where the power delivery is uninterrupted during opening and closing of the door; and where:
   the supporting device is a clevis having a fixed clevis portion as the first portion, where the second portion is a rotating clevis portion attached to support one end of an extending rod that extends substantially in parallel with the vehicle door to operate with a door-opening device mounted in the door to move the door;
   the energy receiving device includes:
      a receiving coil mounted on the rotating clevis portion a fixed distance from the energy transmitting source,
      an extended power conductor attached to the rotating clevis portion and rigidly extending substantially parallel to the vehicle door, the extended power conductor connected to form a closed electrical loop with the receiving coil, and
      a mobile coil magnetically coupled to the extended power conductor and attached to the door-opening device to maintain the magnetic coupling as the door opens and closes, the mobile coil configured to generate an oscillating power source in the vehicle door from the magnetic coupling with the extended power conductor.
10. The power delivery system of claim 9 where the extended power conductor is a U-shaped conductor rod having an open end and a closed end, and where the open end of the U-shaped conductor rod is attached to the rotating clevis portion.
11. The power delivery system of claim 9 where the mobile coil is formed as a collar slidably around the extended power conductor.
12. The power delivery system of claim 9 further comprising:
   a bracket for mounting the extended power conductor to the rotating clevis portion.
13. The power delivery system of claim 9 where the receiving coil includes a magnetic core having first and second ends extending from a coil wire, each of the first and second ends having an arcuate-defined surface to face the transmitting coil along a circumference at the fixed distance.
14. A power delivery system for providing power from a vehicle to a vehicle door, the power delivery system comprising:
   a supporting device having a first portion fixedly mounted to a vehicle frame and a second portion attached to a door and movable about a hinge axis portion that connects the first portion to the second portion;
   an energy transmitting source connected to a power frequency generator, the power frequency generator being connected to a power source and configured to couple an oscillating signal to the energy transmitting source, the energy transmitting source positioned aligned with the hinge axis portion of the supporting device;

an energy receiving device magnetically coupled to the energy transmitting source to receive a power signal from the energy transmitting source, the energy receiving device mounted on the second portion of the supporting device at a fixed distance from the energy transmitting source;

where the energy receiving device receives the power signal from the energy transmitting source to deliver the power signal to powered components and where the power delivery is uninterrupted during opening and closing of the door;

where the supporting device is a clevis having a fixed clevis portion as the first portion, where the second portion is a rotating clevis portion attached to support one end of an extending rod that extends substantially in parallel with the vehicle door to operate with a door-opening device mounted in the door to move the door; and the energy receiving device includes:
- a U-shaped energy receiving device attached at an open end of the U shape to the rotating clevis portion a fixed distance from the energy transmitting source, the U-shaped energy receiving device rigidly extending substantially parallel to the vehicle door and made of a magnetic material to generate a magnetic field via a magnetic coupling with the energy transmitting source, and
- a mobile coil magnetically coupled to the U-shaped energy receiving device and attached to the door-opening device to maintain the magnetic coupling as the door opens and closes, the mobile coil configured to receive an oscillating magnetic field generated by magnetic coupling between the energy transmitting source and U-shaped energy receiving device to generate an oscillating power signal in the vehicle door across the mobile coil.

15. The power delivery system of claim 14 where the U-shaped energy receiving device is a U-shaped magnetic rod having an open end and a closed end, and where the open end of the U-shaped magnetic rod is attached to the rotating clevis portion.

16. The power delivery system of claim 14 further comprising:
a bracket for mounting the U-shaped energy receiving device to the rotating clevis portion.

17. The power delivery system of claim 14 where the mobile coil is formed as a collar slidably around the U-shaped energy receiving device.

18. The power delivery system of claim 14 where the U-shaped energy receiving device includes first and second surfaces on the open end, the first and second surfaces being arcuate-defined surfaces to face the transmitting coil along a circumference at the fixed distance.

19. A contactless power delivery system for installation in a vehicle having a power-assisted vehicle door, a vehicle power source, and a supporting device with a first portion mounted to the vehicle and a second portion attached to the door and movable about a hinge axis portion that connects the first portion to the second portion, the contactless power delivery system comprising:
an energy transmitting source connected to a power frequency generator, the power frequency generator being connected to the power source and configured to couple an oscillating signal to the energy transmitting source, where the energy transmitting source is configured to mount in a fixed position aligned with the hinge axis portion of the supporting device;

an energy receiving device magnetically coupled to the energy transmitting source to receive a power signal from the energy transmitting source, where the energy receiving device is configured to mount on the second portion of the supporting device at a fixed distance from the energy transmitting source; and where the energy receiving device receives the power signal from the energy transmitting source to deliver the power signal to powered components and where the power delivery is uninterrupted during opening and closing of the door.

20. The contactless power delivery system of claim 19 where the supporting device is a hinge configured to mount the door to the vehicle, where:
the energy transmitting source is configured for mounting on the hinge axis portion, and the energy receiving device is configured for mounting on the second portion of the supporting device.

21. The contactless power delivery system of claim 19 where the supporting device is a hinge configured to mount the door to the vehicle, where:
the energy transmitting source is formed integrally with a substitute hinge axis portion for substituting the hinge axis portion of the supporting device with the substitute hinge axis portion.

22. The contactless power delivery system of claim 19 where the supporting device is a clevis, the first portion is a fixed clevis portion, and the second portion is a rotating clevis portion, where the vehicle door includes an extending rod attached at one end to the rotating clevis portion and extending substantially in parallel with the vehicle door to operate with a door-opening device mounted in the door to move the door, the energy receiving device of the contactless power delivery system further comprising:
- a receiving coil configured to mount on the rotating clevis portion a fixed distance from the energy transmitting source,
- an extended power conductor configured to attach to the rotating clevis portion and to rigidly extend substantially parallel to the vehicle door, the extended power conductor configured to electrically connect to form a closed electrical loop with the receiving coil, and
- a mobile coil magnetically coupled to the extended power conductor and configured to attach to the door-opening device to maintain the magnetic coupling as the door opens and closes, the mobile coil configured to generate an oscillating power source in the vehicle door from the magnetic coupling with the extended power conductor.

23. The contactless power delivery system of claim 22 where the extended power conductor is a U-shaped conductor rod having an open end and a closed end, and where the open end of the U-shaped conductor rod is configured to attach to the rotating clevis portion.

24. The contactless power delivery system of claim 22 where the mobile coil is formed as a collar slidably around the extended power conductor.

25. The contactless power delivery system of claim 22 further comprising:
a bracket for mounting the extended power conductor to the rotating clevis portion.

26. The contactless power delivery system of claim 22 where the receiving coil includes a magnetic core having first and second ends extending from a coil wire, each of the first and second ends having an arcuate-defined surface to face the transmitting coil along a circumference at the fixed distance.

27. The contactless power delivery system of claim 19 where the supporting device is a clevis, the first portion is a fixed clevis portion, and the second portion is a rotating clevis portion, where the vehicle door includes an extending rod attached at one end to the rotating clevis portion and extending substantially in parallel with the vehicle door to operate with a door-opening device mounted in the door to move the door, the energy receiving device of the contactless power delivery system further comprising:

the energy receiving device includes:
a U-shaped energy receiving device configured to attach at an open end of the 'U' shape to the rotating clevis portion a fixed distance from the energy transmitting source to rigidly extend substantially parallel to the vehicle door, where the U-shaped energy receiving device is made of a magnetic material to generate a magnetic field via a magnetic coupling with the energy transmitting source, and
a mobile coil configured to attach to the door-opening device to maintain a magnetic coupling as the door opens and closes, where the mobile coil is configured to receive an oscillating magnetic field generated by magnetic coupling between the energy transmitting source and U-shaped energy receiving device and to generate an oscillating power signal in the vehicle door.

28. The contactless power delivery system of claim 27 where the U-shaped energy receiving device is a U-shaped magnetic rod having an open end and a closed end, and where the open end of the U-shaped magnetic rod is configured to attach to the rotating clevis portion.

29. The contactless power delivery system of claim 27 where the mobile coil is formed as a collar slidably around the U-shaped energy receiving device.

30. The contactless power delivery system of claim 27 further comprising:
a bracket for mounting the U-shaped energy receiving device to the rotating clevis portion.

31. The contactless power delivery system of claim 27 where the U-shaped energy receiving device includes first and second surfaces on the open end, the first and second surfaces being arcuate-defined surfaces to face the transmitting coil along a circumference at the fixed distance.

32. The contactless power delivery system of claim 19 further comprising:
a conditioning unit configured to connect to receive the oscillating power signal from the energy receiving device and to convert the oscillating power signal to a vehicle door power source.

33. The contactless power delivery system of claim 32 where the conditioning unit further includes:
a rectifier for converting the oscillating power signal to a DC power source.

34. The contactless power delivery system of claim 33 where the receiving device includes a coil, and the conditioning unit further includes:
a resonance capacitor for maintaining a resonance circuit with the inductance of the receiving device.

35. The contactless power delivery system of claim 19 where the power frequency generator includes:
an oscillator to generate an oscillating DC signal having a selected AC power frequency;
a switch driver to generate switch signals; and
a DC-to-AC converter coupled to the vehicle power source and to the energy transmitting source, the DC-to-AC converter including a plurality of switches controlled by the switch signals from the switch driver to couple the vehicle power source to the energy transmitting source as an AC power signal.

36. A method for delivering power from a vehicle to a door mounted on the vehicle comprising:
generating a power magnetic field having electrical energy from a vehicle power source;
receiving the power magnetic field at an energy receiving device via magnetic coupling where the energy receiving device includes a mobile component attached to a door-opening device configured to move linearly to and from a door hinge point as the door opens and closes; and
coupling electrical energy from the power magnetic field as a power source to the mobile component of the energy receiving device as the mobile component moves when the door is being opened or closed.

37. The method of claim 36 further comprising:
converting the oscillating power signal from an AC power signal to a DC power source.

38. A method for delivering power from a vehicle to a door mounted on the vehicle comprising:
generating a power magnetic field having electrical energy from a vehicle power source;
receiving the power magnetic field at an energy receiving device via magnetic coupling where the energy receiving device includes a mobile component attached to a door-opening device configured to move linearly to and from a door hinge point as the door opens and closes;
coupling electrical energy from the power magnetic field as a power source to electrical components associated with the vehicle door; and
coupling electrical energy to the mobile component of the energy receiving device as the mobile component moves when the door is being opened or closed.

39. The method of claim 38 where the energy receiving device includes a receiving coil, an extended power conductor connected to the receiving coil, and a sliding collar coil formed around the extended power conductor, where:
the step of receiving the power magnetic field includes generating an oscillating power signal from the power magnetic field across the receiving coil; and
the step of coupling electrical energy includes:
coupling the oscillating power signal to the extended power conductor to generate an oscillating magnetic field around the extended power conductor;
coupling the oscillating magnetic field to the sliding collar coil to generate the oscillating power signal across the sliding collar coil; and
coupling the oscillating power signal as a power source to electrical components associated with the door.

40. The method of claim 38 where the energy receiving device includes an extended U-shaped magnetic rod and a sliding collar coil formed around the extended U-shaped magnetic rod, where:
the step of receiving the power magnetic field includes generating an oscillating magnetic field around the extended U-shaped magnetic rod;
the step of coupling electrical energy includes:
coupling the oscillating magnetic field to the sliding collar coil formed around the extended U-shaped magnetic rod to generate the oscillating power signal across the sliding collar coil; and
coupling the oscillating power signal as a power source to electrical components associated with the door.

* * * * *